(12) United States Patent
Dong (10) Patent No.: US 6,665,009 B1
(45) Date of Patent: Dec. 16, 2003

(54) ON-CHIP DEAD PIXEL CORRECTION IN A CMOS IMAGING SENSOR

(75) Inventor: Kimble Dong, Sunnyvale, CA (US)

(73) Assignee: OmniVision Technologies, Inc., Sunnyvale, CA (US)

( * ) Notice: Subject to any disclaimer, the term of this patent is extended or adjusted under 35 U.S.C. 154(b) by 0 days.

(21) Appl. No.: 09/082,355

(22) Filed: May 20, 1998

(51) Int. Cl.$^7$ ................................................. H04N 9/64
(52) U.S. Cl. ....................................................... 348/246
(58) Field of Search ................................. 348/302, 243, 348/246, 247

(56) References Cited

U.S. PATENT DOCUMENTS

| | | | |
|---|---|---|---|
| 4,513,312 A | | 4/1985 | Takemura |
| 4,542,409 A | | 9/1985 | Ochi |
| 4,652,911 A | | 3/1987 | Teranishi et al. |
| 4,686,373 A | | 8/1987 | Tew et al. |
| 4,805,023 A | * | 2/1989 | Younse et al. ............... 348/246 |
| 4,920,428 A | * | 4/1990 | Lin et al. ..................... 348/246 |
| 4,939,573 A | | 7/1990 | Teranishi et al. |
| 5,047,861 A | * | 9/1991 | Houchin et al. ............. 348/247 |
| 5,282,025 A | | 1/1994 | Sato |
| 5,345,266 A | | 9/1994 | Denyer |
| 5,392,070 A | * | 2/1995 | Endo et al. .................. 348/246 |
| 5,436,659 A | * | 7/1995 | Vincent ........................ 348/246 |
| 5,471,515 A | | 11/1995 | Fossum et al. |
| 5,499,114 A | * | 3/1996 | Compton ..................... 348/246 |
| 5,781,233 A | * | 7/1998 | Liang et al. ................. 348/302 |
| 5,796,430 A | * | 8/1998 | Katoh et al. ................. 348/246 |
| 6,340,989 B1 | * | 1/2002 | Oda ............................. 348/246 |
| 6,396,539 B1 | * | 5/2002 | Heller et al. ................ 348/246 |
| 2002/0030753 A1 | * | 3/2002 | Kramer et al. .............. 348/308 |

OTHER PUBLICATIONS

D. Cormier, "Solid–State Optical Sensors Improve Their Image," *ESD: The Electronic System Design Magazine*, Jan. 1989, pp. 36–42.

P.B. Denyer et al., "Intelligent CMOS Imaging," *Charge–Coupled Devices and Solid State Optical Sensors V*—SPIE Proceedings, San Jose, California, Feb. 1995, pp. 285–291.

E.R. Fossum, "Active Pixel Sensors: Are CCD's Dinosaurs?" *Charge–Coupled Devices and Solid State Optical Sensors III*—SPIE Proceedings, San Jose, California, Feb. 1993, pp. 2–14.

R.M. Hodgson, "Charge Transfer Devices and Their Application," *New Zealand Engineering*, vol. 34, No. 11, Nov. 15, 1979, pp. 246–249.

T. Imaide et al., "Single–Chip Color Cameras with Reduced Aliasing," *Journal of Imaging Technology*, vol. 12, No. 5, Oct. 1986, pp. 258–260.

(List continued on next page.)

*Primary Examiner*—Vu Le
*Assistant Examiner*—Rashawn N. Tillery
(74) *Attorney, Agent, or Firm*—Perkins Coie LLP (57) ABSTRACT

In a MOS imaging array, dead pixels may occur in that if the cell of the pixel has a defect in its PN junction, it may generate current leakage paths, thus causing the cell site to appear as a white spot in the image signal. The number of dead pixels on a CMOS image sensor is dependent on the process quality used for forming the image sensor. The present invention corrects for dead pixels with circuitry that may be fabricated on a single integrated MOS chip. When the MOS imaging device is first turned on, the pixel signals from the cell array are read out and a dead pixel determination method is used to determine dead pixels. A digital referencing scheme is used such that when a dead pixel is located, its digital location is stored in a designated storage area. Then normal data image signal processing begins, with the location of each pixel that is being read out being monitored. When a pixel with a location that corresponds to the stored location for a dead pixel is read out, the signal processing circuitry compensates for the pixel signal rather than providing it as part of the normal image signal. One method by which the signal processing circuitry may compensate for the dead pixel signal is to repeat the signal from the pixel that was read out immediately prior to the dead pixel.

24 Claims, 5 Drawing Sheets

OTHER PUBLICATIONS

H. Kawashima et al., "A 1/4 Inch Format 250K Pixel Amplified MOS Image Sensor Using CMOS Process," *IEDM Technical Digest*, Dec. 5–8, 1993, pp. 575–578.

S.K. Mendis et al., "Progress in CMOS Active Pixel Image Sensors," *Charge–Coupled Devices and Solid State Optical Sensors IV—SPIE Proceedings*, San Jose, California, Feb. 1994, pp. 19–29.

R.H. Nixon et al., "128X128 CMOS Photodiode–Type Active Pixel Sensor with On–Chip Timing, Control and Signal Chain Electronics," *Charge–Coupled Devices and Solid State Optical Sensors V—SPIE Proceedings*, San Jose, California, Feb. 1995, pp. 117–123.

M. Onga et al., "New Signal–Processing LSIs for the 8mm Camcorder," *IEEE Transactions on Consumer Electronics*, vol. 36, No. 3, Aug. 1990, pp. 494–501.

T. Ozaki et al., "Low–Noise Line–Amplified MOS Imaging Devices," *IEEE Transactions on Electron Devices*, vol. 38, No. 5, May 1991, pp. 969–975.

K.A. Parulski, "Color Filters and Processing Alternatives for One–Chip Cameras," *IEEE Transactions on Electron Devices*, vol. ED–32, No. 8, Aug. 1985, pp. 1381–1389.

S. Tsuruta et al., "Color Pixel Arrangement Evaluation for LC–TV," *Conference Record of the 1985 International Display Research Conferences*, San Diego, California, Oct. 1985, pp. 24–26.

T. Watanabe et al., "A CCD Color Signal Separation IC for Single–Chip Color Imagers," *IEEE Journal of Solid–State Circuits*, vol. SC–19, No. 1, Feb. 1984, pp. 49–54.

\* cited by examiner

ON-CHIP DEAD PIXEL CORRECTION IN A CMOS IMAGING SENSOR

FIELD OF THE INVENTION

The present invention relates to metal oxide semiconductor (MOS) imaging arrays and, more particularly, to a method for correcting for dead pixels in MOS imaging arrays.

BACKGROUND OF THE INVENTION

Integrated circuit technology has revolutionized various fields including computers, control systems, telecommunications, and imaging. In the field of imaging, the charge coupled device (CCD) sensor has made possible the manufacture of relatively low-cost and small hand-held video cameras. However, the solid-state CCD integrated circuits needed for imaging are relatively difficult to manufacture, and therefore are expensive. In addition, because of the differing processes involved in the manufacture of CCD integrated circuits relative to MOS integrated circuits, the signal processing portion of the imaging sensor has typically been located on a separate integrated chip. Thus, a CCD imaging device includes at least two integrated circuits: one for the CCD sensor and one for the signal processing logic.

An alternative low-cost technology to CCD integrated circuits is the metal oxide semiconductor (MOS) integrated circuit. Not only are imaging devices using MOS technology less expensive to manufacture relative to CCD imaging devices, for certain applications MOS devices are superior in performance. For example, the pixel elements in a MOS device can be made smaller and therefore provide a higher resolution than CCD image sensors. In addition, the signal processing logic necessary can be integrated alongside the imaging circuitry, thus allowing for a single integrated chip to form a complete stand-alone imaging device.

Examples of MOS imaging devices are detailed in "A ¼ Inch Format 250 K Pixel Amplified MOS Image Sensor Using CMOS Process" by Kawashima et al., IEDM 93–575 (1993), and "A Low Noise Line-Amplified MOS Imaging Devices" by Ozaki et al., IEEE *Transactions on Electron Devices*, Vol. 38, No. 5, May 1991. In addition, U.S. Pat. No. 5,345,266 to Denyer titled "Matrix Array Image Sensor Chip" describes a MOS image sensor. The devices disclosed in these publications provide a general design approach to MOS imaging devices.

The primary building block of an image formed by an MOS imaging device is a pixel. The number, size, and spacing of the pixels determine the resolution of the image generated by the imaging device. The pixels of a MOS imaging device are semiconductor devices that transform incident light photons into current signals at an array cell, which may be a diode or gate cell. The signal produced by each pixel is generally extremely small, in the nanoampere range.

Although generally quite reliable, the pixels may from time to time exhibit anomalous behavior. For example, if the array cell of the pixel has a defect in its PN junction, it may generate current leakage paths, thus causing the cell site to appear as a white spot in the image signal. The pixel of such a cell site may be referred to as a "dead pixel." The number of dead pixels on a CMOS image sensor is dependent on the quality of the process used for forming the image sensor. In a high resolution sensor that has one million or more pixels, a number of dead pixels invariably result.

The present invention is directed to a method and apparatus that compensates for the foregoing and other problems of the prior art. More specifically, the present invention is directed to a method and apparatus for correcting for dead pixels in a CMOS image sensor.

SUMMARY OF THE INVENTION

A method for correcting for dead pixels in a CMOS image sensor is disclosed. According to the method, when the image sensor is first powered on, the pixel array is examined for dead pixels and the locations of any dead pixels that are found are digitally stored. Thereafter, as a given frame of the image sensor is scanned out, the location of the pixels in the frame are compared to the stored locations for dead pixels, and if a dead pixel is determined, the dead pixel signal is compensated for. One method of compensating for a dead pixel signal is to replace it with the pixel signal from a previous pixel, or an average of the previous and following pixels.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
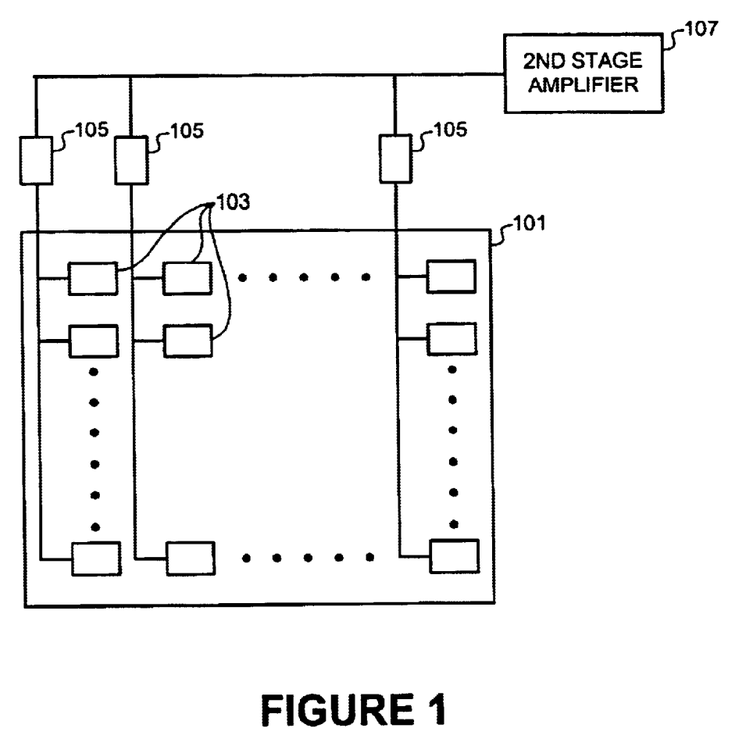
FIG. 1 is a schematic diagram of a pixel array of a CMOS imaging sensor.

With reference to FIG. 1, an architecture for a CMOS imaging array 101 includes a rectangular matrix of pixels 103. The number of pixels in the horizontal or x-direction and the number of pixels in the vertical or y-direction constitute the resolution of the imaging array 101. Each of the pixels 103 in a vertical column routes its signal to a single charge amplifier 105.

The retrieval of information from the pixels 103 follows the well-known raster scanning technique. In particular, a row of pixels 103 is scanned sequentially from left to right. The next row is then scanned in this manner until all rows have been scanned sequentially from top to bottom. At the end of each complete scan of the entire array 101, a vertical blanking period of predetermined time occurs until the raster scanning pattern is repeated. This type of scanning follows the NTSC scanning scheme. Control circuitry of conventional design is operative to sequentially read the pixels 103 in this manner.

As each pixel is scanned, the signal from that pixel is provided to the charge amplifier 105 for that column. Thus, the charge amplifiers 105 receive signals sequentially. The sequential signals from the charge amplifiers 105 are then forwarded to a second-stage amplifier 107, which amplifies the signals so that they may be further processed.

Figure 2:
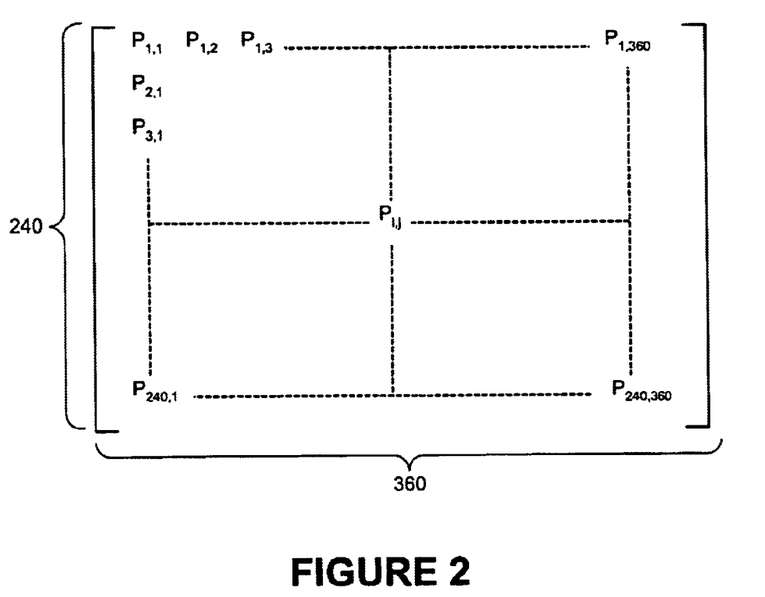
FIG. 2 is a schematic diagram illustrating a pixel referencing scheme for a matrix of pixels of a CMOS imaging sensor.

FIG. 2 illustrates a schematic representation of a pixel referencing scheme for referencing the pixels of the pixel array. As seen in the example of FIG. 2, the referencing scheme is a matrix having dimensions of 240×360. It will be understood that much larger matrixes may be used, and that the matrix shown in FIG. 2 is for purposes of illustration only. Each coordinate of the matrix P(i,j) corresponds to a pixel. For purposes of the present invention, subscripts "i" and "j" are used to identify the particular pixel in the frame.

Figure 3:
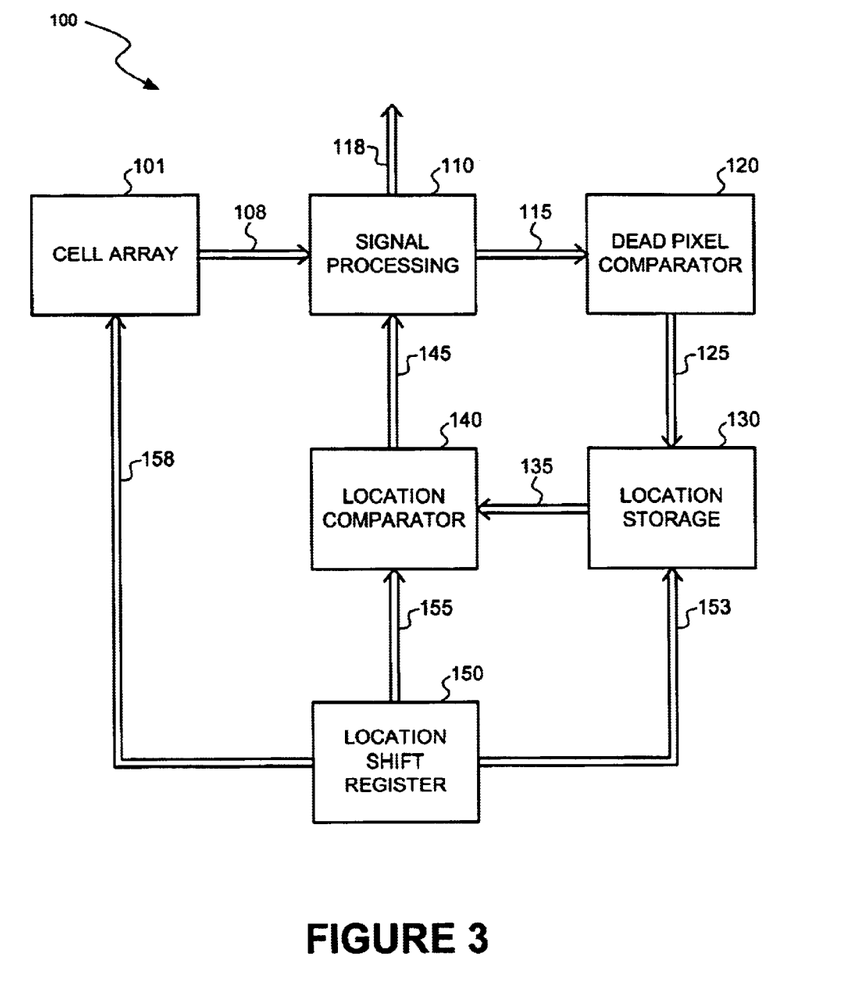
FIG. 3 is a block diagram of a CMOS imaging sensor including dead pixel correction circuitry formed in accordance with the present invention.

FIG. 3 illustrates a block diagram of a CMOS image sensor with circuitry for correcting for dead pixels according to the present invention. As illustrated in FIG. 3, the CMOS image sensor 100 includes a cell array 101 that outputs pixel signals on lines 108 to signal processing circuitry 110. Signal processing circuitry 110 outputs initial dead pixel processing signals on lines 115 to a dead pixel comparator 120, and thereafter outputs normal image processing signals on lines 118. Dead pixel comparator 120 outputs dead pixel location signals on lines 125 to location storage circuitry 130. Location storage circuitry 130 outputs dead pixel location signals on lines 135 to a location comparator 140. Location comparator 140 outputs dead pixel indication signals on lines 145 to signal processing circuitry 110. A location shift register 150 outputs location signals on lines 153 to location storage circuitry 130, outputs location signals on lines 155 to location comparator 140, and also outputs location signals on lines 158 to cell array 101.

The circuitry of FIG. 3 generally operates in the following manner. When the CMOS image sensor 100 is first turned on, or is otherwise initialized, location shift register 150 indicates digital pixel coordinates (according to location storage numbers that correspond to a referencing scheme such as that shown in FIG. 2) as the pixel signals from cell array 101 are read out by signal processing circuitry 110. As will be described in more detail below, if an EPROM storage circuit or similar device is not used to store the dead pixel locations, the dead pixels will need to be scanned each time the image sensor is powered on. To determine the location of any dead pixels during the initialization phase, the signal processing circuitry 110 initially provides the first set of pixel signals to dead pixel comparator 120. A detailed description of one manner in which the dead pixel comparator 120 may operate is described in a pending U.S. patent application titled "Method for Correcting False Spikes in a MOS Imaging Array," Ser. No. 08/747,902, filed Nov. 14, 1996, which is commonly assigned and hereby incorporated by reference.

In the present invention, the general process for determining dead pixels is to first precharge the cell array 101 with a fixed voltage. Then the entire array is shielded from light, and the pixels of the array are read sequentially by the signal processing circuitry 110. During this process, the dead pixel comparator 120 determines if each pixel is a dead pixel. When a dead pixel is determined, its location from location shift register 150 is then digitally stored in location storage circuitry 130. Once the entire cell array 101 has been read out, all of the dead pixel locations will have been determined and stored in location storage circuitry 130.

After the initial dead pixel location process is complete, normal image processing can begin. During normal image processing, location shift register 150 indicates digital pixel location numbers (corresponding to a referencing scheme such as that shown in FIG. 2) as the pixel signals from cell array 101 are read out to signal processing circuitry 110.

Location shift register 150 also outputs the current pixel location number to location comparator 140. Location comparator 140 compares the current pixel location number to see if it matches a dead pixel location number as stored in location storage circuitry 130. If location comparator 140 determines that the current pixel corresponds with a dead pixel location, then location comparator 140 outputs a dead pixel indication signal to signal processing circuitry 110.

Signal processing circuitry 110 receives the pixel signals from each pixel of the array 101, and as each pixel is read out, the signal processing circuitry 110 determines whether a dead pixel indication signal is being received from location comparator 140. If the signal processing circuitry 110 does not receive a signal from location comparator 140 indicating that the current pixel being processed corresponds to a dead pixel, then signal processing circuitry 110 outputs the pixel signal as part of the normal image signal on lines 118. If, however, the signal processing circuitry 110 receives a signal from the location comparator 140 that indicates that the current pixel being processed does correspond to a dead pixel, then the signal processing circuitry 110 instead compensates for the signal from the dead pixel.

In the preferred embodiment, the signal processing circuitry 110 may compensate for a dead pixel by repeating the pixel signal from the previously read out pixel. The signal from the previous pixel is easily repeated because it is still contained in signal processing circuitry 110 from the previous pixel processing. In addition, more complex compensation methods may also be used, such as replacing the dead pixel value with an average of the previous and following pixel values. Also, in some embodiments, an external storage circuit may make more memory available to store large dead pixel location storage numbers.

Figure 4A:
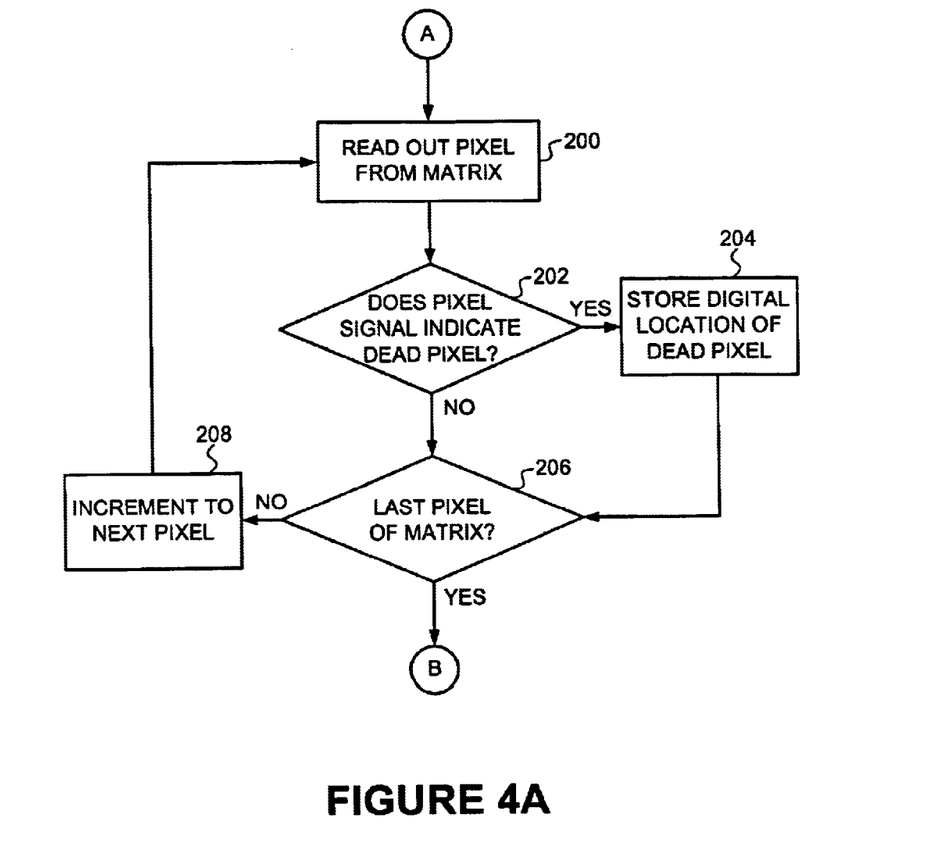
FIG. 4A is a flow diagram illustrating the initial dead pixel determination and location storage method of the present invention.
Figure 4B:
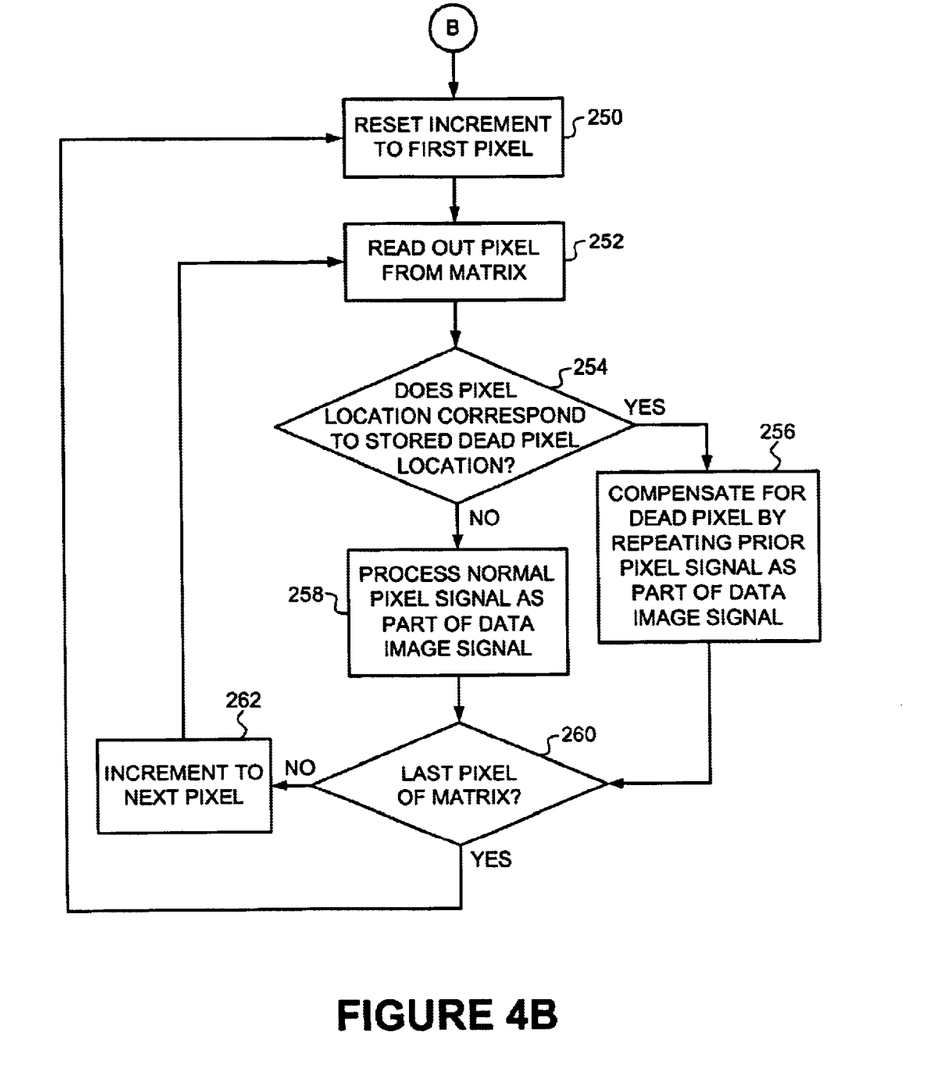
FIG. 4B is a flow diagram illustrating the image signal processing and dead pixel correction method of the present invention.

FIGS. 4A and 4B are flow diagrams illustrating the general method of operation for the circuitry of FIG. 3. As shown in FIG. 4A, the initial dead pixel location process begins at a point "A." At a block 200, after the image sensor is powered on or otherwise initialized, the first pixel of the matrix is read out. At a block 202, a determination is made as to whether the pixel is a dead pixel. If the pixel is a dead pixel, the routine proceeds to a block 204, and if the pixel is not a dead pixel, the routine proceeds to a decision block 206. At block 204, the digital location of the dead pixel is stored, after which the routine proceeds to decision block 206.

At decision block 206, a determination is made as to whether the last pixel of the frame has been reached. If the last pixel of the frame has not been reached, then the routine proceeds to a block 208 where the routine increments to the next pixel of the frame, and returns to block 200 to read the next pixel from the pixel array. If the last pixel of the frame has been reached, then the routine proceeds to point "B," where normal signal processing may begin as described below for FIG. 4B.

As shown in FIG. 4B, from a point "B," the routine proceeds to block 250 where the incrementing is reset to the first pixel of the matrix. At a block 252, the pixel signal is read out from the pixel array. At a decision block 254, the routine determines whether the pixel location corresponds to the stored location of a dead pixel. If the pixel location corresponds to the stored location of a dead pixel, then the routine proceeds to a block 256, and if the pixel location does not correspond to the stored location of a dead pixel, then the routine proceeds to a block 258. At block 256, the routine compensates for a dead pixel by repeating the prior pixel signal as part of the image signal, and then proceeds to a decision block 260. At block 258, the routine processes the pixel signal as part of the normal image signal.

At decision block 260, the routine determines whether the last pixel of the frame has been reached. If the last pixel of the frame has not been reached, then the routine proceeds to block 262 where the routine increments to the next pixel, and then returns to block 252 for reading out the next pixel from the matrix. If at decision block 260 the routine determines that the last pixel of the frame has been reached, then the routine returns to block 250 to reset the location increment to the first pixel of the matrix.

The method of the present invention is advantageous over previous methods which did not digitally store the locations of dead pixels and which therefore had to determine the dead pixels every time the pixel array was read out. Thus, through use of the present invention the stored dead pixel locations only need to be determined once during the initial location process and can be corrected for thereafter during normal signal processing. This process is faster and more efficient, as less signal processing is required to determine the dead each time the pixel array is read out.

In addition, all of the circuitry shown in FIG. 3 may be fabricated as part of a single chip for the CMOS image sensor 100. As illustrated in FIG. 3, relatively simple processing circuitry allows for relatively small location storage circuitry 130 to be used, in that only the locations of the dead pixels need to be stored. Thus, the chip size of the CMOS image sensor 100 can be kept small while using the dead pixel correction method of the present invention. However, it will be understood that the location storage circuitry 130 could also be implemented in an off-chip format, such as through an external EPROM. Using an external EPROM, more memory would generally be available and more complicated system designs for the method of the present invention could be used. In addition, these types of memory could allow the dead pixel locations to remain in storage even when the image sensor was powered off, thus not requiring the initial dead pixel location process to be repeated every time the image sensor was powered on. However, it will also be understood that the dead pixel location process may be repeated at any time to update the dead pixel locations that are stored.

While the preferred embodiment of the invention has been illustrated and described, it will be appreciated that various changes can be made therein without departing from the spirit and scope of the invention. The present invention has been described in relation to a preferred embodiment and several variations. One of ordinary skill after reading the foregoing specification will be able to effect various other changes, alterations, and substitutions of equivalents without departing from the broad concepts disclosed. It is therefore intended that the scope of the letters patent granted hereon be limited only by the definition contained in the appended claims and equivalents thereof, and not by limitations of the embodiments described thereof.

The embodiments of the invention in which an exclusive property or privilege is claimed are defined as follows:

1. A CMOS image sensor formed using a CMOS manufacturing process on a single integrated circuit comprising:
   a pixel array formed from a plurality of pixels arranged in a matrix of rows and columns and formed using said CMOS manufacturing process and formed on said single integrated circuit;
   location processing means for providing a digital location number for each pixel of the pixel array and formed using said CMOS manufacturing process and formed on said single integrated circuit;
   signal processing circuitry for reading out signals from the pixel array and outputting processed pixel signals formed using said CMOS manufacturing process on said single integrated circuit;
   dead pixel comparator circuitry formed using said CMOS manufacturing process on said single integrated circuit for receiving the processed pixel signals from the signal processing circuitry and examining the processed pixel signals to see if they are indicative of dead pixels;
   location storage circuitry for receiving dead pixel information from the dead pixel comparator circuitry and for storing the digital location number generated by the location processing means for each dead pixel and formed using said CMOS manufacturing process and formed on said single integrated circuit; and
   location comparator circuitry for comparing the digital location number of a pixel that is being processed by the signal processing circuitry with the stored digital location numbers of dead pixels to determine if the pixel that is being processed corresponds to a dead pixel and formed using said CMOS manufacturing process and formed on said single integrated circuit.

2. The image sensor of claim 1, wherein the location processing means comprises a location shift register for indicating the digital location number of each of the pixels to the pixel array, the location comparator circuitry, and the location storage circuitry.

3. The image sensor of claim 1, wherein the signal processing circuitry compensates for a dead pixel by repeating a pixel signal from a pixel that was read out prior to the dead pixel.

4. The image sensor of claim 1, wherein the signal processing circuitry compensates for a dead pixel by averaging the pixel signal from a pixel that was read out prior to the dead pixel with a pixel signal from a pixel that is read out subsequent to the dead pixel.

5. The image sensor of claim 1, wherein the dead pixel comparator is initially activated when the image sensor is first powered on to examine the processed pixel signals from each pixel only once.

6. The CMOS image sensor of claim 5, wherein the dead pixel comparator may be activated at later times to reexamine the processed pixel signals from each pixel so as to update the dead pixel digital location numbers stored in the location storage circuitry.

7. The image sensor of claim 1, wherein the location storage circuitry is coupled to an off chip storage area such as an EPROM.

8. A method for correcting for dead pixels in a CMOS imaging array, said imaging array including a plurality of pixels arranged in a matrix of rows and columns, said CMOS imaging array formed using a CMOS manufacturing process and formed on a single integrated circuit, said method comprising the steps of:
   precharging said plurality of pixels to a fixed voltage;
   sequentially examining the signals from each pixel in the imaging array to determine if each pixel is a dead pixel;
   storing a location number of each dead pixel in a memory formed using said CMOS manufacturing process and formed on said single integrated circuit;
   after all of the dead pixels have been determined and their location numbers stored, proceeding with normal image processing of the imaging array, during which as the signal from each pixel is read out, using a location comparator circuit to compare the location number of each pixel with the stored location numbers for dead pixels, and the signal from any pixel with a location number that corresponds to the stored location number of a dead pixel is compensated for, said location comparator circuit formed using said CMOS manufacturing process and formed on said single integrated circuit.

9. The method of claim 8, wherein the signal from a pixel with a location number that corresponds to the stored location number of a dead pixel is compensated for by repeating a pixel signal from a pixel that was read out prior to the dead pixel.

10. The method of claim 8, wherein the signal from a pixel with a location number that corresponds to the stored location number of a dead pixel is compensated for by averaging the pixel signals from prior and subsequent pixels around the dead pixel.

11. The method of claim 8, further including shielding said plurality of pixels from incident light.

12. method of claim 8, wherein a location comparator is used to perform the step of comparing the location number of a pixel with a stored location number for a dead pixel.

13. The method of claim 8, wherein the stored location numbers of the dead pixels may be updated by repeating the steps of sequentially examining the signals from each pixel in the imaging array to determine if each pixel is a dead pixel and then storing the location numbers of each dead pixel.

14. A method for correcting for dead pixels in a CMOS imaging array, said imaging array including a plurality of pixels arranged in a matrix of rows and columns, said CMOS imaging array formed using a CMOS manufacturing process and formed on a single integrated circuit, said method comprising the steps of:
  (a) reading out a pixel signal from a pixel in the pixel array;
  (b) determining if the pixel signal from the pixel indicates that the pixel is a dead pixel;
  (c) storing a location number of a dead pixel in a memory formed using said CMOS manufacturing process and formed on said single integrated circuit;
  (d) repeating steps (a) to (c) for each pixel in the pixel array until all of the pixels have been read out; and
  (e) thereafter using a location comparator circuit to compare the location number of each pixel that is being read out with the stored location numbers of dead pixels and compensating for the signal from a pixel whose location number corresponds to the stored location number of a dead pixel, and said location comparator circuit formed using said CMOS manufacturing process and formed on said single integrated circuit.

15. The method of claim 14, wherein compensating for the signal from a dead pixel in step (e) is carried out by repeating a pixel signal from a pixel that was read out prior to the dead pixel.

16. The method of claim 14, wherein compensating for the signal from a dead pixel in step (e) is carried out by averaging the pixel signals from other pixels near the dead pixel.

17. The method of claim 14, wherein the stored location numbers of the dead pixels may be updated by repeating steps (a) to (d).

18. A method for correcting for dead pixels in a CMOS imaging array, said imaging array including a plurality of pixels arranged in a matrix of rows and columns, said CMOS imaging array formed using a CMOS manufacturing process and formed on a single integrated circuit, said method comprising the steps of:
  (a) generating a location number for a pixel in the pixel array and reading out the signal from the pixel;
  (b) determining if the signal from the pixel indicates that the pixel is a dead pixel;
  (c) if the signal from the pixel indicates that the pixel is a dead pixel, storing the location number of the dead pixel in a storage area formed using said CMOS manufacturing process and formed on said single integrated circuit;
  (d) repeating steps (a) to (c) until all of the pixels have been read out;
  (e) after all of the pixels have initially been read out and the dead pixel location numbers have been stored, reading out a signal from a pixel in the pixel array;
  (f) using a location comparator circuit to compare the location number of the pixel that is currently being read with the stored location numbers of the dead pixels, said location comparator circuit formed using said CMOS manufacturing process and formed on said single integrated circuit;
  (g) compensating for a pixel whose location number corresponds to a stored location number of a dead pixel; and
  (h) repeating steps (e) to (g) for all of the pixels in the pixel array to produce each frame of the image signal.

19. The method of claim 18, wherein the process in step (g) for compensating for a dead pixel includes outputting a signal from a pixel that was read out prior to the dead pixel.

20. The method of claim 18, wherein the process in step (g) for compensating for a dead pixel includes outputting a signal that is an average of signals from pixels near the dead pixel.

21. A CMOS image sensor formed using said CMOS manufacturing process and formed on said single integrated circuit comprising:
  a pixel array formed from a plurality of pixels arranged in a matrix of rows and columns and formed using said CMOS manufacturing process and formed on said single integrated circuit;
  signal processing circuitry for reading out signals from the pixel array and outputting processed pixel signals and formed using said CMOS manufacturing process and formed on said single integrated circuit;
  a location shift register for incrementing location numbers for pixels in the pixel array and formed using said CMOS manufacturing process and formed on said single integrated circuit; and
  dead pixel comparator circuitry for receiving the processed pixel signals from the signal processing circuitry and examining the processed pixel signals to see if they are indicative of dead pixels, and for indicating when the location number of a pixel that is determined to be a dead pixel should be stored and formed using said CMOS manufacturing process and formed on said single integrated circuit.

22. The image sensor of claim 21, wherein all of the circuitry of the image sensor is fabricated on a single CMOS chip.

23. The image sensor of claim 21, further comprising location storage circuitry for storing the location numbers of dead pixels.

24. The image sensor of claim 23, further comprising location comparator circuitry for comparing the location number of a pixel that is being processed by the signal processing circuitry with the stored location numbers of dead pixels from the location storage circuitry to determine if the pixel that is being processed corresponds to a dead pixel.

* * * * *

UNITED STATES PATENT AND TRADEMARK OFFICE
CERTIFICATE OF CORRECTION

PATENT NO. : 6,665,009 B1
DATED : December 16, 2003
INVENTOR(S) : Kimble Dong It is certified that error appears in the above-identified patent and that said Letters Patent is hereby corrected as shown below:

Column 7,
Line 18, insert -- The -- between "12." and "method";

Signed and Sealed this

Twenty-second Day of June, 2004

JON W. DUDAS
*Acting Director of the United States Patent and Trademark Office*